United States Patent [19]

Fahlen et al.

[11] 4,058,778

[45] Nov. 15, 1977

[54] HIGH POWER GAS TRANSPORT LASER

[75] Inventors: Theodore S. Fahlen, San Jose; Russell F. Kirk, Sunnyvale, both of Calif.

[73] Assignee: GTE Sylvania Incorporated, Mountain View, Calif.

[21] Appl. No.: 699,628

[22] Filed: June 25, 1976

[51] Int. Cl.² .................................................. H01S 3/00
[52] U.S. Cl. ........................... 331/94.5 G; 331/94.5 D; 331/94.5 C
[58] Field of Search ..................... 331/94.5 G, 94.5 D, 331/94.5 C; 330/4.3

[56] References Cited

U.S. PATENT DOCUMENTS

| 3,772,610 | 11/1973 | Foster et al. | 331/94.5 |
| 3,886,481 | 5/1975 | Foster et al. | 331/94.5 T |

Primary Examiner—Martin H. Edlow
Attorney, Agent, or Firm—John F. Lawler

[57] ABSTRACT

Continuous wave (CW) output power from a gas transport laser is substantially increased without arcing by the use of a tubular cathode having a racetrack-shaped cross section and disposed in the main stream of gas flow through the laser channel transversely of the direction of flow and spaced above and upstream from a coextensive segmented anode in the opposite wall of the channel. The racetrack-shaped cross-sectional configuration of the cathode provides maximum electrode surface for generating a glow mode electric discharge and also induces turbulence at that surface so as to support high current densities without arcing. Continuous output power greater than 3.5 KW is achieved with improved efficiency with this electrode configuration.

4 Claims, 4 Drawing Figures

HIGH POWER GAS TRANSPORT LASER

BACKGROUND OF THE INVENTION

This invention relates to high power gas transport lasers.

U.S. Pat. No. 3,772,610 describes a relatively compact carbon dioxide laser capable of producing continuous output power of 1 to 2 KW at 10.6 $\mu$. This laser has been used successfully for industrial purposes such as cutting, welding and heat treating but is limited as indicated above in its power generating capabilities. There is a continuing need for still higher power industrial lasers of this type while nevertheless retaining the advantages of practicable weight and size.

Higher power is obtained by increasing the magnitude of the discharge current in the flowing gas. One way to increase the discharge current without arcing is to increase the cathode surface area per unit length of the cylindrical cathode by increasing the diameter which in turn causes a larger impedance to the high velocity gas flowing by the cathode. This results in reduction in gas flow velocity which is detrimental to both output power and discharge stability.

The prime disadvantage in use of the single cylindrically tubular cathode to extend the power limits, then, is that its surface area cannot be increased as required to provide higher current without adversely blocking gas flow. If on the other hand the larger cathode surface area is obtained with a streamlined cross-sectional configuration such as an airfoil shape, electrical performance is unsatisfactory because arcs form due to the absence of turbulence in the gas adjacent to the cathode surface.

Another way to provide a larger cathode surface without substantial disruption of gas flow is by utilizing a plurality of cylindrical cathodes as described in the copending application of T. S. Fahlen and R. F. Kirk, Ser. No. 662,941, assigned to the assignee of this invention. While the plural cathode arrangement has been used successfully in attaining greater output power, such a laser is less efficient to operate because of the ballast resistors required for balancing current flow through the cathodes.

OBJECTS AND SUMMARY OF THE INVENTION

A general object of the invention is the provision of a high power (>3 KW) CW laser of simple and efficient design.

A further object is the provision of such a high power laser having a practicable size and weight.

These and other objects of the invention are achieved with a flowing gas laser having a transverse tubular cathode with an elongated racetrack-shaped cross section and spaced above and coextensive with a segmented anode. The direction of elongation of the cathode cross section is generally the same as that of the gas flow. This cathode not only has an increased area of active surface but also produces the desired turbulence in the gas adjacent to such surface for supporting a uniform arcless glow mode electrical discharge of high current density.

DESCRIPTION OF PREFERRED EMBODIMENT

Figure 1:
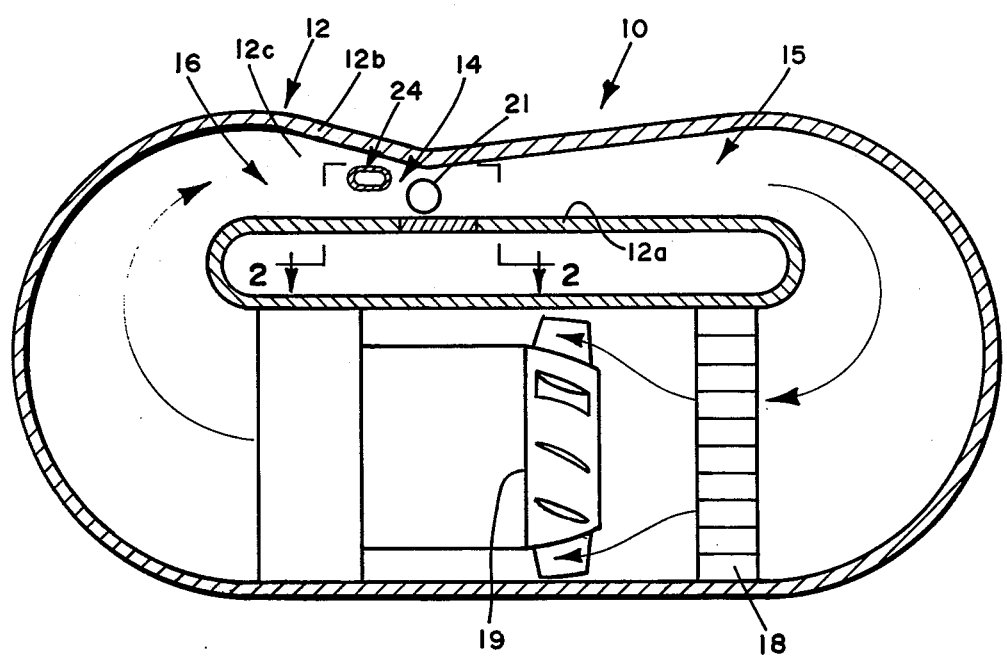
FIG. 1 is a schematic vertical section of a closed cycle gas transport laser embodying the invention.
Figure 2:
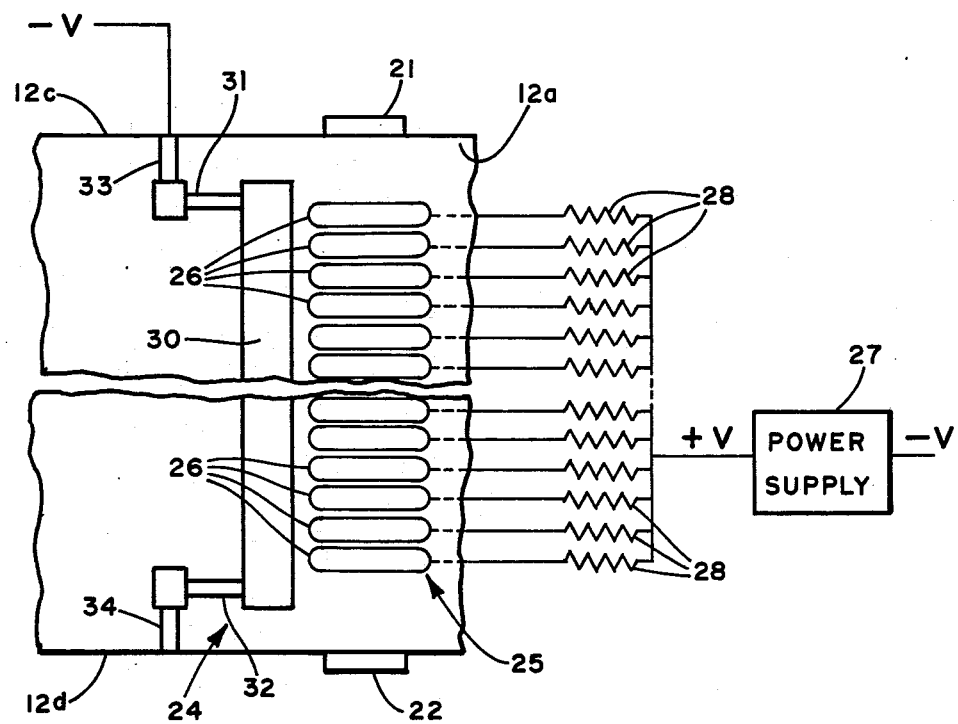
FIG. 2 is an enlarged view of the lasing region of the apparatus showing the electrode arrangement, the view being taken on line 2—2 of FIG. 1.
Figure 3:
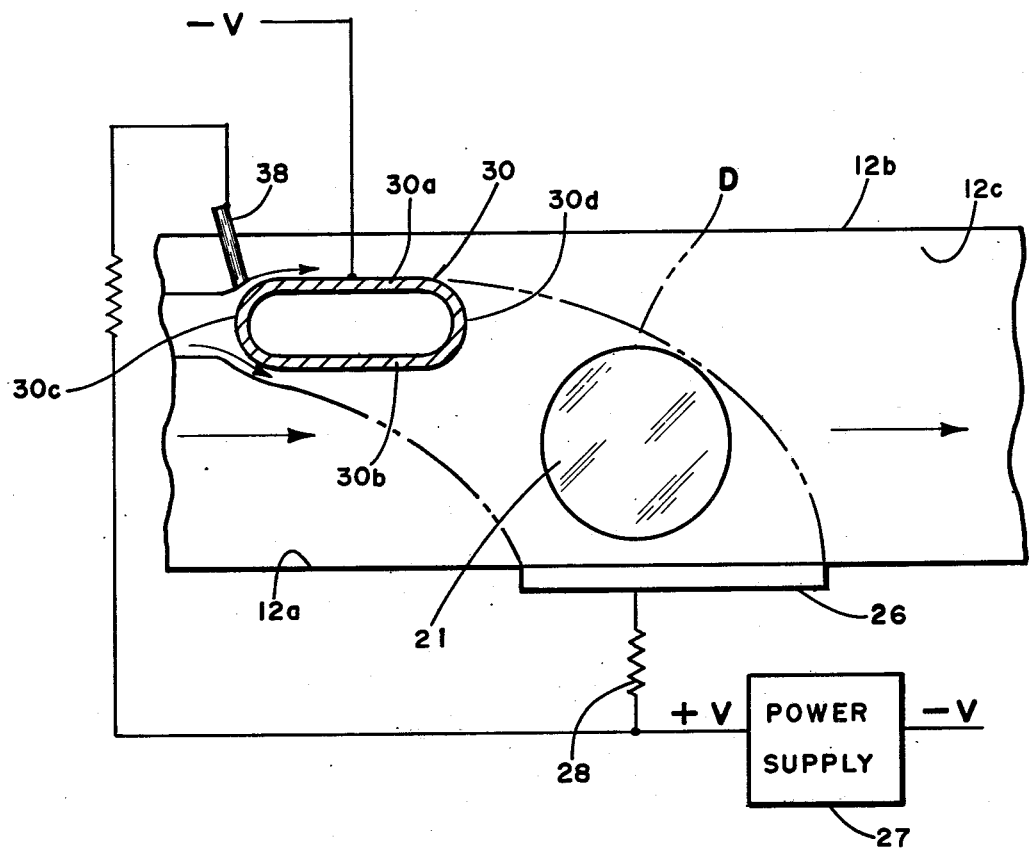
FIG. 3 is an enlarged view of part of FIG. 1 showing the discharge envelope between the cathode and anode.

Referring now to the drawings, FIG. 1 is a schematic representation of a closed cycle high power gas transport laser system 10 having a channel or duct 12 with a bottom wall 12a, see FIGS. 2 and 3, a top wall 12b and side walls 12c and 12d generally configured to define a closed fluid path through which a gas mixture is recirculated in the direction of the arrows. The channel preferably has a rectangular cross-sectional shape and has a narrow or throat section 14 which defines the active or lasing region of the system, a diffuser zone 15 on the downstream side of the active region in which the gas velocity is reduced, and a nozzle section 16 upstream from the active region in which the gas velocity is increased prior to entering the throat. The remainder of the laser system includes a heat exchanger 18 which removes heat from the gas flowing through it and a vane-axial blower 19 which circulates the gas through the channel. The gas mixture preferably used in this system consists of helium, nitrogen and carbon dioxide in well known proportions that support lasing action in the active region 14 for producing coherent light at 10.6 $\mu$.

Mounted in the side walls of the channel in optical alignment with the lasing region are mirrors 21 and 22 between which the beam is reflected when the system is operated either as an oscillator or as an amplifier. In practice, mirrors 21 and 22 are constructed so as to reflect the coherent beams several times through the active region before it exits as the output, thus increasing the effective length of the laser without increasing its physical size.

The electric discharge in the lasing region 14 of the laser extends between a cathode generally indicated at 24 and an anode 25. Anode 25 consists of a plurality of segments or pads 26 mounted in the channel bottom wall 12a in a row generally parallel to and coextensive with cathode 24. Pads 26 are electrically insulated from each other and have rounded or curved trailing edges as shown. The anode is energized by electrical connection of pads 26 to the positive terminal +V of power supply 27 through ballast resistors 28, respectively, as shown.

The above described laser system, except for the cathode construction described below, is disclosed in the foregoing patent and does not per se constitute this invention.

Cathode 24 comprises an elongated straight main body portion 30, tubular legs 31 and 32 connected perpendicularly to the upstream side of body portion 30 at opposite ends, and tubular support members 33 and 34 connecting legs 31 and 32 to side walls 12c and 12d, respectively. The cathode is connected to the negative terminal −V of an external direct current power supply 27 as indicated and to a source of coolant, not shown, which directs the coolant through all parts of the cathode.

Figure 4:
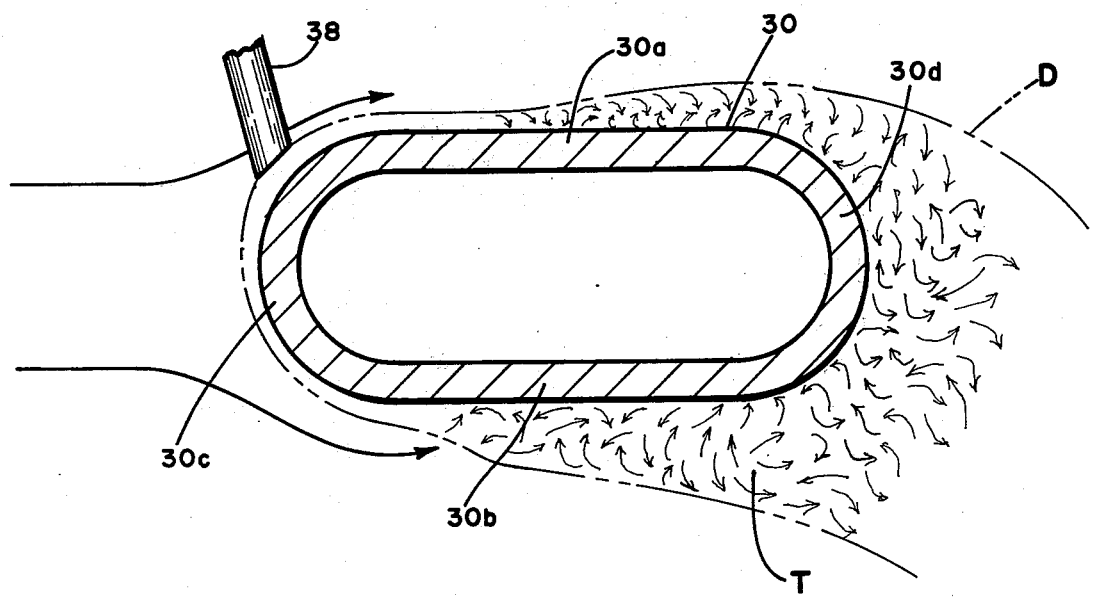
FIG. 4 is a greatly enlarged view of part of FIG. 3 showing the gas turbulence adjacent to the cathode.

Body portion 30 of the cathode is a tubular conductor such as polished brass or copper having a cross-sectional shape of a racetrack, see FIGS. 3 and 4, defined by plane parallel upper and lower wall parts 30a and 30b, respectively, and rounded, preferably semi-cylindrically-shaped, leading and trailing edges 30c and 30d, respectively. The racetrack-shaped cathode configuration provides substantially more active surface area for supporting the electric discharge D between the electrodes as compared to a cylindrical cathode of the same frontal cross section so as to be capable of carrying correspondingly greater current per unit length.

In addition to providing greater active surface area, the reacetrack cross section importantly induces the desired turbulence in the gas adjacent to the cathode surface at both the upper part 30a and the lower part 30b as well as the trailing edge 30d, such turbulence being indicated by the curved arrows at T in FIG. 3. The following explanation of fluid flow dynamics with respect to the cathode in the gas transport laser will provide a better understanding of the principle of the invention.

When the gas stream encounters a fixed obstruction, such as the cathode, the gas must divide to pass around the barrier. Because of the viscous adhesion, the boundary layer (gas moving along the surface of the obstruction) moves slower than outer layers. After the flow impediment has been passed, both the boundary layer and faster moving outer layer must separate from the cathode to recombine. At very low velocities, this combination occurs without much turbulence. As the velocity increases, however, the boundary layer tends to cling longer than the outer layer, resulting in the formation of local vortices in the fluid behind the obstruction, known as Karman street of vortices.

As the flow velocity further increases, the vortices line up behind the cathode and alternate in sequence from one side to the other, i.e., alternately from the top and bottom sides. This alternating from top to bottom is caused by a strong pressure pulse which accompanies the formation of each vortex and temporarily inhibits the formation of a vortex on the opposite side. After the newly formed vortex has moved downstream, pressure in the separation area of the opposite side suddenly falls and a new vortex is produced there. This effect then becomes an oscillation with a series of vortices alternating from side to side and having equal spacings.

The vibration or oscillation frequency "n" is related to the flow velocity and the maximum broadside dimension of the cathode by $$n = f(R_e) V/D$$

where $f(R_e)$ = a function of the dimension less Reynolds number $R_e = DV \rho/\mu$ n = vibration frequency, hz.
V = flow velocity, feet/second
D = maximum dimension perpendicular to the flow in feet
$\rho$ = fluid density, lbs/ft.$^3$
$\mu$ = fluid viscosity, lb./ft. sec.

Higher oscillation frequencies are desirable to cause thorough mixing and prevent thermal hot spots. Simply increasing the diameter of the cathode to gain area causes a decrease in the frequency. The racetrack configuration, however, results in increased cathode surface area with no decrease in the oscillation frequency.

In summary, this racetrack configuration not only increases surface area of cathode but does so in such a way as to (1) not decrease the rate of vortex gas mixing and (2) not increase the impedance to gas flow. The gas turbulence is believed to produce a homogeneous gas mass in which temperature gradients that induce arcing are absent. Thus this cross-sectional shape of the cathode permits attainment of substantially greater power in the laser without arcing.

A starter electrode 38 described in the foregoing patent is positioned close to the leading edge 30c of the cathode to facilitate initiation of the glow discharge during start-up of the laser.

In operation, the output of power supply 27 is applied across the cathode and anode as starter electrode 38 initially generates ions at the cathode. These ions flow downstream into the lasing region and lower the threshold potential so that an arcless electric discharge is established between the anode and cathode. This discharge induces population inversion in the atomic structure of the carbon dioxide gas mixture which generates coherent light in the well known manner. The racetrack cross-sectional configuration of cathode 24 and its position relative to anode pads 26 and mirrors 21 and 22 permits a highly dense electron stream to flow through the gas in a stable manner without arcing.

What is claimed is:

1. High power gas transport laser apparatus comprising
    a channel having top and bottom walls and side walls,
    a gas mixture comprising carbon dioxide in said channel,
    means for moving said gas mixture through said channel at a predetermined velocity,
    means for producing an electric discharge in said gas mixture transversely of the direction of flow comprising
        a tubular cathode disposed between said top and bottom walls transversely of the direction of said gas flow, said cathode having a cross-sectional shape elongated in the direction of gas flow and rounded leading and trailing edges,
        a plane segmented anode adjacent to said bottom wall on the downstream side of said cathode and substantially parallel thereto, and
        means for electrically energizing said cathode and anode to establish therebetween a glow mode electric discharge through said flowing gas mixture,
    mirror means adjacent the side walls of said channel and optically aligned with said electric discharge for directing a beam of coherent light therethrough.

2. Laser apparatus according to claim 1 in which said cross-sectional shape is a racetrack configuration defined by parallel wall parts extending between the rounded end parts.

3. Laser apparatus according to claim 2 in which said cathode has a main body portion extending perpendicular to the direction of flow and side leg portions extending upstream from opposite ends of the main body portion, said side leg portions intersecting the main body portion at right angles.

4. Laser apparatus according to claim 2 in which said leading and trailing edges are semi-cylindrically shaped.

* * * * *